(12) United States Patent
Busse et al.

(10) Patent No.: US 12,214,772 B2
(45) Date of Patent: Feb. 4, 2025

(54) MODEL PREDICTIVE CONTROL OF A MOTOR VEHICLE

(71) Applicant: ZF Friedrichshafen AG, Friedrichshafen (DE)

(72) Inventors: Timon Busse, Munich (DE); Timo Wehlen, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 175 days.

(21) Appl. No.: 17/777,120

(22) PCT Filed: Nov. 14, 2019

(86) PCT No.: PCT/EP2019/081329
§ 371 (c)(1),
(2) Date: May 16, 2022

(87) PCT Pub. No.: WO2021/093954
PCT Pub. Date: May 20, 2021

(65) Prior Publication Data
US 2023/0034418 A1    Feb. 2, 2023

(51) Int. Cl.
*B60W 20/13*    (2016.01)
*B60L 58/26*    (2019.01)

(52) U.S. Cl.
CPC ............ *B60W 20/13* (2016.01); *B60L 58/26* (2019.02); *B60W 2510/081* (2013.01); *B60W 2510/085* (2013.01); *B60W 2510/087* (2013.01)

(58) Field of Classification Search
CPC .......... B60W 20/13; B60W 2510/081; B60W 2510/085; B60W 2510/087;
(Continued)

(56) References Cited

U.S. PATENT DOCUMENTS

| | | | | |
|---|---|---|---|---|
| 10,006,504 B2 * | 6/2018 | Locher | ............... | F16H 57/0412 |
| 2009/0133859 A1 * | 5/2009 | Suzuki | ............... | B60H 1/00278 |
| | | | | 417/1 |

(Continued)

FOREIGN PATENT DOCUMENTS

| | | |
|---|---|---|
| CN | 103502074 A | 1/2014 |
| CN | 103534454 A | 1/2014 |

(Continued)

OTHER PUBLICATIONS

English translation of Stocker (DE 102018005948) (Year: 2018).*
English translation of Mitsuya (JP-2010081704) (Year: 2010).*
International Search Report (English Translation) PCT/EP2019/081329, dated Jun. 8, 2020. (2 pages).
Chinese Office Action for Application No. 201980101272.1 Dated Nov. 20, 2024.

*Primary Examiner* — James M McPherson
*Assistant Examiner* — Kyle J Kingsland
(74) *Attorney, Agent, or Firm* — Dority & Manning, P.A.

(57) ABSTRACT

A processor unit (3) is configured for executing an MPC algorithm (13) for model predictive control of a motor vehicle (1). The MPC algorithm (13) includes a longitudinal dynamic model (14) of the motor vehicle (1) and a cost function (15) to be minimized. The cost function (15) includes multiple terms, a first term of which represents an output of the cooling pump (28). In addition, the processor unit (3) is configured for, by executing the MPC algorithm (13) as a function of the longitudinal dynamic model (14), ascertaining a speed trajectory of the motor vehicle (1) situated within a prediction horizon and simultaneously ascertaining a pump operating value trajectory situated within the prediction horizon such that the first term of the cost function (15) is minimized.

11 Claims, 2 Drawing Sheets

(58) Field of Classification Search
CPC ..... B60W 30/1843; B60W 2050/0031; B60W 2720/103; B60W 10/184; B60W 20/11; B60W 50/0097; B60W 10/30; B60L 58/26; B60L 2240/12; B60L 2240/36; B60L 2260/56; B60L 1/003
See application file for complete search history.

(56) References Cited

U.S. PATENT DOCUMENTS

2014/0149006 A1* 5/2014 Eriksson ................ F01P 7/165
 701/54
2014/0311180 A1* 10/2014 Kawakami ........ H01M 8/04059
 62/498

FOREIGN PATENT DOCUMENTS

| | | |
|---|---|---|
| CN | 108454612 A | 8/2018 |
| DE | 102013110346 A1 | 4/2014 |
| DE | 102017124735 A1 | 4/2019 |
| DE | 102018005948 A1 | 10/2019 |
| EP | 3072769 A2 | 9/2016 |
| JP | 2010081704 A * | 4/2010 |
| WO | WO2012155940 A1 | 11/2012 |
| WO | WO2018104850 A1 | 6/2018 |

* cited by examiner

MODEL PREDICTIVE CONTROL OF A MOTOR VEHICLE

CROSS-REFERENCE TO RELATED APPLICATION

The present application is a U.S. national phase of PCT/EP2019/081329 filed in the European Patent Office on Nov. 14, 2019, which is incorporated by reference in its entirety for all purposes.

FIELD OF THE INVENTION

The invention relates generally to the model predictive control of a motor vehicle.

BACKGROUND

The efficiency of an (electric) vehicle can be greatly influenced by the heating-up and cooling-down of the drive train, of the battery, and of various other components. Although the extent of the thermal influences depends greatly on the particular vehicle, it applies in general that the driving efficiency can be improved due to an optimized thermal management. The components have various cooling requirements depending on the operating situation. Different efficiency levels result depending on the temperature and the operating point.

One type of variable cooling is cooling with the aid of one or multiple cooling pump(s). Cooling pump control systems for the closed-loop control of an optimal component temperature are known, wherein on-demand cooling systems can be utilized. These on-demand cooling systems are either controlled by a controller and a specified temperature or follow a rules-based logic. The cooling power of the pump can be controlled by a closed-loop control circuit. The controller attempts to minimize the deviation from a given desired temperature. This approach can only partially be deemed an efficiency optimization, however. This is due primarily to two effects. On the one hand, the optimal component temperature is not the same in every operating situation. On the other hand, the cooling power implies a pump output, which must be considered to be a loss.

DE 10 2018 005 948 A1 discloses a vehicle model utilized for calculating predictive vehicle parameters, in particular a vehicle speed. The vehicle model outputs predictive vehicle parameters, which are transmitted as input values to the cooling circuit model. The cooling circuit model is processed after the vehicle model. The cooling circuit model calculates a predictive temperature of a coolant before and after every component of a cooling circuit system. The cooling circuit model outputs predictive cooling circuit parameters, which are processed to obtain output parameters, for example, a rotational speed and/or an actuating position of a coolant pump.

DE 10 2013 110 346 A1 teaches a method for operating a drive train of a vehicle, which is driveable via at least one electric prime mover, wherein a prediction about the future temperatures of at least one preferably electric component in the drive train is formulated and the drive train is operated as a function of the predicted temperatures. In order to improve the efficiency, it is provided that an optimal operating temperature range for an optimal efficiency is associated with each component in the drive train, a driving route is selected and an initial speed profile for specified values of the vehicle speed are associated with the driving route, a prediction about the future load and the future operating temperature of the components is formulated on the basis of the speed profile along this driving route, and, for the driving route, the speed profile for the vehicle is adapted to the marginal conditions such that the optimal operating temperature range is maintained for each component during the selected driving route.

Moreover, EP 3 072 769 A2 describes a method for limiting a search space for a model-based on-line optimization method, which determines a predicted optimal first profile of a state variable of a vehicle within a predefined search space for an upcoming route section. The method is distinguished by the determination of a predicted second profile of the state variable along the upcoming route section as a function of route information of the upcoming route section, wherein the search space is limited as a function of the determined predicted second profile of the state variable.

SUMMARY OF THE INVENTION

Example aspects of the present invention provide an, in particular, more efficient closed-loop control of at least one cooling pump of a motor vehicle.

According to example aspects of the present invention, it is provided to integrate a cooling pump control as a degree of freedom into an efficiency optimization as a whole with the aid of an MPC solver. One or multiple cooling pump(s) can be operated based on a predictive longitudinal driving strategy. The at least one cooling pump can be controlled by an MPC-based logic, as the result of which an optimization of the efficiency is enabled at the system level. As a result, the activation of one or multiple cooling pump(s) can be planned such that the least amount of energy is lost. In other words, a combination of one or multiple controllable (cooling) pumps with a predictive driving strategy is provided. The subject matter of example aspects of the invention is the integration of the pump control into an MPC-based driving strategy. An MPC solver can minimize the cost function, which includes multiple terms. One of these terms can describe the output of the at least one pump. One further term can describe, for example, losses of other components with respect to their output.

For this purpose, the use of the pump as an additional degree of freedom or the pumps as additional degrees of freedom is made available to the driving strategy. The driving strategy can plan an optimal speed trajectory for the upcoming route section under consideration of the route topology, the traffic, and further pieces of surroundings information. This speed trajectory can now be planned together with the new degree of freedom. In this sense, the strategy no longer only plans a trajectory, but also the adjustment of the pump output (=output of the pump) along this trajectory. In this way, an integrated optimization of various degrees of freedom is carried out, which results in a driving behavior that is more efficient as a whole. It should be noted that the optimization of the individual degrees of freedom is carried out simultaneously. Thereafter, the optimal degree-of-freedom planning can be transmitted to a target generator, which can be implemented, in particular, by a software module.

In this sense, according to a first example aspect of the invention, a processor unit is provided for the model predictive control of a motor vehicle, wherein the motor vehicle includes a cooling pump, which can be operated with different pump operating values of at least one operating parameter. The processor unit is configured for executing an MPC algorithm for the model predictive control of a motor vehicle, wherein the MPC algorithm includes a longitudinal dynamic model of the motor vehicle and a cost function to be minimized. The cost function includes multiple terms, a first term of which represents an output of the cooling pump. The processor unit is configured for ascertaining a speed trajectory of the motor vehicle situated within a prediction horizon by executing the MPC algorithm as a function of the longitudinal dynamic model. This can take place, in particular, such that the cost function as a whole is minimized. In addition, the processor unit is configured for ascertaining a pump operating value trajectory situated within the prediction horizon simultaneously with the calculation of the speed trajectory by executing the MPC algorithm such that the first term of the cost function is minimized.

According to a second example aspect of the invention, a motor vehicle is provided. The motor vehicle includes a processor unit according to the first example aspect of the invention. In addition, the motor vehicle includes a driver assistance system, a drive train, and a cooling pump, which can be operated with different pump operating values of at least one operating parameter. The driver assistance system is configured for accessing a speed trajectory of the motor vehicle ascertained by the processor unit, which is situated within a prediction horizon. In addition, the driver assistance system is configured for accessing a pump operating value trajectory simultaneously ascertained by the processor unit, which is situated within the prediction horizon. Moreover, the driver assistance system is configured for controlling the drive train of the motor vehicle based on the speed trajectory of the motor vehicle and for controlling the cooling pump based on the pump operating value trajectory.

The motor vehicle is a vehicle driven by a prime mover, for example, an automobile (for example, a passenger car having a weight of less than three and a half tons (3.5 t)), a motorcycle, a motor scooter, a moped, a bicycle, an e-bike, a bus, or a truck (for example, having a weight of more than three and a half tons (3.5 t)), or also a rail vehicle, a ship, or an aircraft, such as a helicopter or an airplane. The invention can also be utilized in small, lightweight electric motor vehicles for micromobility, wherein these motor vehicles are utilized, in particular, in city traffic and for the first mile and the last mile in rural areas. The first mile and the last mile can be understood as all routes and paths that are located in the first and last links of a mobility chain. This is, for example, the path from home to the train station or the route from the train station to the workplace. In other words, the invention is usable in all areas of transportation, such as automotive, aviation, nautical science, astronautics, etc. The motor vehicle can belong, for example, to a vehicle fleet.

According to a third example aspect of the invention, a method is provided for the model predictive control of a motor vehicle, wherein the motor vehicle includes a cooling pump, which can be operated with different pump operating values of at least one operating parameter. The method includes executing an MPC algorithm for the model predictive control of the motor vehicle, wherein the MPC algorithm includes a longitudinal dynamic model of the motor vehicle and a cost function to be minimized, and wherein the cost function includes multiple terms, a first term of which represents an output of the cooling pump, ascertaining a speed trajectory of the motor vehicle situated within a prediction horizon by executing the MPC algorithm as a function of the longitudinal dynamic model; this can take place, in particular, such that the cost function as a whole is minimized; and ascertaining a pump operating value trajectory situated within the prediction horizon by executing the MPC algorithm such that the first term of the cost function is minimized, wherein the ascertainment of the speed trajectory and of the pump operating value trajectory take place simultaneously.

According to a fourth example aspect of the invention, a computer program product is provided for the model predictive control of a motor vehicle, wherein the motor vehicle includes a cooling pump, which can be operated with different pump operating values of at least one operating parameter, wherein the computer program product, when run on a processor unit, instructs the processor unit to execute an MPC algorithm for the model predictive control of a motor vehicle. The MPC algorithm includes a longitudinal dynamic model of the motor vehicle and a cost function to be minimized, wherein the cost function includes multiple terms, a first term of which represents an output of the cooling pump. In addition, the computer program product, when run on a processor unit, instructs the processor unit to ascertain a speed trajectory of the motor vehicle situated within a prediction horizon by executing the MPC algorithm as a function of the longitudinal dynamic model and simultaneously ascertain a pump operating value trajectory situated within the prediction horizon such that the first term of the cost function is minimized. The ascertainment of the speed trajectory can be carried out, in particular, such that the cost function as a whole is minimized.

In the following, concretizations, definitions, and example embodiments of the invention are described primarily in conjunction with the processor unit according to the first example aspect of the invention. These comments also apply similarly for corresponding example embodiments of the motor vehicle according to the second example aspect of the invention, of the method according to the third example aspect of the invention, and of the computer program product according to the fourth example aspect of the invention.

The feature "trajectory" can be understood to be a path that the motor vehicle is to follow in the future within a prediction horizon, for example, within the next few seconds. A speed profile of the motor vehicle can be associated with the path, wherein the speed profile can predefine a target speed for the motor vehicle for each point along the path. This assignment made up of path and speed yields the speed trajectory of the motor vehicle. In addition, a trajectory can also describe a profile of the pump operating values, which are associated with an operating parameter of the cooling pump and which are to set in at the pump within the prediction horizon. This trajectory can represent the pump operating value trajectory. Exemplary operating parameters of the cooling pump are its displacement, in particular the flow rate deliverable by the cooling pump, and the pressure that can be built up by the pump, wherein appropriate pump operating values are then different displacement values, flow rates, and pressure values.

The pump operating values, for example, the displacement, can be converted, in the longitudinal model of the motor vehicle, in particular in the vehicle loss model described further below, into a pump output, which can be directly incorporated into the cost function as a power loss. From a mathematical perspective, it can also be advantageous, for example, to plan the rotational speed of the cooling pump. In this case, an adaptation of the vehicle model would be necessary, so that the influence of the planning on the cost function to be minimized can be mathematically represented.

In addition, the invention is not limited to ascertaining and implementing the operating value trajectory for one single cooling pump of the motor vehicle. Rather, two, three, or even more cooling pumps of the motor vehicle can be planned and controlled as described in the present case. Accordingly, when "the" cooling pump is described, it can be assumed that this means the "at least one" cooling pump.

The method of model predictive control (MPC) was selected in order to find, in any situation under established marginal conditions and constraints, an optimal solution for a "driving efficiency" driving function, which is to provide an efficient driving style. The MPC method is based on a system model (in example aspects of the present invention, the system model is formed by the longitudinal dynamic model), which describes the behavior of the system. In addition, the MPC method is based on an objective function or on a cost function that describes an optimization problem and determines which state variables are to be minimized.

The longitudinal dynamic model of the motor vehicle can include a vehicle model with vehicle parameters and drive train losses (in part, approximated characteristic maps). In particular, the at least one cooling pump can be represented and calculated or simulated by the longitudinal dynamic model with the different pump operating values of the at least one operating parameter. Findings regarding upcoming route topographies (for example, curves and uphill grades) can be incorporated into the longitudinal dynamic model of the motor vehicle. In addition, findings regarding speed limits on the upcoming route can also be incorporated into the longitudinal dynamic model of the drive train.

Current state variables can be measured and appropriate data can be recorded and supplied to the MPC algorithm. In this way, route data from an electronic map can be updated, in particular cyclically, for a prediction horizon (for example, four hundred meters (400 m)) ahead of the motor vehicle. The route data can include, for example, uphill grade information, curve information, and information about speed limits. Moreover, a curve curvature can be converted, via a maximum permissible lateral acceleration, into a speed limit for the motor vehicle. In addition, a position finding of the motor vehicle can be carried out, in particular via a GNSS signal for the precise localization on the electronic map.

The MPC algorithm can include an MPC solver in the form of a software module for the simultaneous ascertainment of the pump operating value trajectory and the speed trajectory of the motor vehicle. The MPC solver can include instructions or program code, as the result of which the processor unit is instructed to optimize the aforementioned trajectories as a function of the longitudinal dynamic model such that the cost function and/or its first term is minimized. In this way, example aspects of the present invention makes it possible to select and implement an optimal combination of trajectories under consideration of the available degrees of freedom.

The opposite of a simultaneous optimization is a sequential optimization. By way of example, a speed trajectory could be planned and, only thereafter, the flow rate of the cooling pump could be planned. As a result, it can happen, however, that a speed trajectory is selected in the first step, which can then be implemented only at high cooling costs. In this way, the speed trajectory that originally appeared to be optimal clearly loses value at the end of the sequential consideration. In the simultaneous ascertainment according to example aspects of the present invention (speed trajectory and pump operating value trajectory), however, both degrees of freedom (i.e., speed of the motor vehicle and operating parameters of the at least one cooling pump) are optimized in the same step under consideration of the particular causalities (vehicle model and longitudinal dynamic model of the motor vehicle). As a result, it can be ensured that the MPC solver finds a global optimum.

The feature that the cost function is minimized "as a whole" can be understood to mean that the sum of the individual costs is minimized. In other words, the cost function includes multiple terms, each of which represents individual costs or cost blocks. One of these terms is the first term, which describes the output (the pump output, for example, the consumed power or the power loss) of the at least one cooling pump. If all terms of the cost function are added up, the result is the entire cost function or even the cost function "as a whole."

Example aspects of the present invention can be utilized, in particular, for an autonomous driving function of the motor vehicle. The autonomous driving function enables the motor vehicle to travel autonomously, i.e., without a vehicle occupant controlling the motor vehicle. The driver has handed over the control of the motor vehicle to the driver assistance system. Thus, the autonomous driving function includes the motor vehicle being configured—in particular by the central processor unit—for carrying out, for example, steering, turn-signaling, acceleration, and braking maneuvers without human intervention and controlling, by an open-loop system, in particular, external lighting and signaling, such as turn-signal lights of the motor vehicle. The autonomous driving functions can also include driving functions that assist a driver of the motor vehicle in the control of the motor vehicle, in particular during steering, turn-signaling, acceleration, and braking maneuvers, wherein the driver still has the control of the motor vehicle.

The processor unit can transmit the optimized pump operating value trajectory and the optimized speed trajectory of the motor vehicle to a software module ("target generator"). By this software module, the processor unit can convert the mathematically optimal planning of the available degrees of freedom, in particular of the degrees of freedom of the at least one cooling pump and at least one component of the drive train (in order to adjust the speed of the motor vehicle), into actually evaluatable component signals. By way of example, a speed trajectory of the vehicle can be optimally planned by the MPC for the next five thousand meters (5000 m). In this case, the target generator would "convert" the first (=actually necessary) speed value of this trajectory, for example, into a demand torque of the electric machine of the motor vehicle. The component software can then operate with this value and regulate the intended speed.

The MPC functionality described in example aspects of the present invention is not limited to a certain component or a certain pump, but rather can be applied anywhere that a flow rate or a pump output can be planned by the MPC algorithm. The effect is that much greater, the more temperature-sensitive are the losses of the cooled component. The power loss to be minimized generally results from the output of the pump plus the additional losses due to the deviation from the ideal temperature of the component to be cooled. The cooling of an interior space of the motor vehicle by a cooling pump for providing an appropriate coolant flow is an exception. The power loss results in this case only from the output of the cooling pump.

Since, in general, not only are the losses, but also, for example, the comfort, minimized by the MPC algorithm, comfort costs can be added to the power loss costs of the cooling pump in the cost function. Comfort costs are a deviation of the actual temperature from the set desired temperature. By the MPC algorithm, an optimal compromise can be reached between temporary deviations from the ideal temperature and energy saved as a result. For example, the interior space temperature can be reduced in an anticipatory manner prior to uphill travel by the MPC algorithm in order to be able to dispense with the air conditioning system during the uphill travel and, in this way, be able to provide all the power for the uphill travel.

In one example embodiment, the at least one cooling pump is arranged in or at the drive train of the motor vehicle for cooling an electric machine and/or a transmission and/or a power electronics unit and/or a battery of the drive train. The aforementioned components of the drive train can be jointly cooled, i.e., one shared cooling pump delivers a coolant through one shared cooling circuit, which is routed along the electric machine, the transmission, the power electronics unit, and the battery of the drive train, and so that the aforementioned components can dissipate heat to the coolant delivered through the cooling circuit by the cooling pump. This example embodiment enables a cooling with particularly little equipment.

The aforementioned components of the drive train can also be cooled individually, wherein a particularly high heat dissipation and, thereby, a particularly effective cooling are enabled. A first cooling pump can deliver a coolant through a first cooling circuit, which is routed along the electric machine of the drive train, and so the electric machine can dissipate heat to the coolant delivered through the first cooling circuit by the first cooling pump. A second cooling pump can deliver a coolant through a second cooling circuit, which is routed along the transmission the drive train, and so the transmission can dissipate heat to the coolant delivered through the second cooling circuit by the second cooling pump. A third cooling pump can deliver a coolant through a third cooling circuit, which is routed along the power electronics unit of the drive train, and so the power electronics unit can dissipate heat to the coolant delivered through the third cooling circuit by the third cooling pump. A fourth cooling pump can deliver a coolant through a fourth cooling circuit, which is routed along the battery of the drive train, and so the battery unit can dissipate heat to the coolant delivered through the fourth cooling circuit by the fourth cooling pump.

In addition, two of the aforementioned components of the drive train can be jointly cooled in each case. This yields the following six combinations. A first shared cooling pump can deliver a coolant through a first shared cooling circuit, which is routed along the electric machine and the transmission of the drive train, and so the aforementioned components can dissipate heat to the coolant delivered through the first shared cooling circuit by the first shared cooling pump. A second shared cooling pump can deliver a coolant through a second shared cooling circuit, which is routed along the power electronics unit and the battery of the drive train, and so the aforementioned components can dissipate heat to the coolant delivered through the second shared cooling circuit by the second shared cooling pump. A third shared cooling pump can deliver a coolant through a third shared cooling circuit, which is routed along the electric machine and the power electronics unit of the drive train, and so the aforementioned components can dissipate heat to the coolant delivered through the third shared cooling circuit by the third shared cooling pump. A fourth shared cooling pump can deliver a coolant through a fourth shared cooling circuit, which is routed along the transmission and the battery of the drive train, and so the aforementioned components can dissipate heat to the coolant delivered through the fourth shared cooling circuit by the fourth shared cooling pump. A fifth shared cooling pump can deliver a coolant through a fifth shared cooling circuit, which is routed along the electric machine and the battery of the drive train, and so the aforementioned components can dissipate heat to the coolant delivered through the fifth shared cooling circuit by the fifth shared cooling pump. A sixth shared cooling pump can deliver a coolant through a sixth shared cooling circuit, which is routed along the transmission and the power electronics unit of the drive train, and so the aforementioned components can dissipate heat to the coolant delivered through the sixth shared cooling circuit by the sixth shared cooling pump.

Moreover, three of the aforementioned components of the drive train can be jointly cooled in each case. This yields the following four combinations. A first shared cooling pump can deliver a coolant through a first shared cooling circuit, which is routed along the transmission, the power electronics unit, and the battery of the drive train, and so the aforementioned components can dissipate heat to the coolant delivered through the first shared cooling circuit by the first shared cooling pump. A second shared cooling pump can deliver a coolant through a second shared cooling circuit, which is routed along the electric machine, the power electronics unit, the battery of the drive train, and so the aforementioned components can dissipate heat to the coolant delivered through the second shared cooling circuit by the second shared cooling pump. A third shared cooling pump can deliver a coolant through a third shared cooling circuit, which is routed along the electric machine, the transmission, and the battery of the drive train, and so the aforementioned components can dissipate heat to the coolant delivered through the third shared cooling circuit by the third shared cooling pump. A fourth shared cooling pump can deliver a coolant through a fourth shared cooling circuit, which is routed along the electric machine, the transmission, and the power electronics unit of the drive train, and so the aforementioned components can dissipate heat to the coolant delivered through the fourth shared cooling circuit by the fourth shared cooling pump.

In addition, the at least one cooling pump can be arranged in a cooling unit for the interior space cooling or at an on-board charger for cooling during charging at the charging station. In this sense, the cooling pump in one example embodiment is configured for delivering a coolant through a cooling circuit, wherein the cooling circuit cools an interior space or an on-board charger of the motor vehicle. Moreover, the at least one cooling pump can also be arranged in a transmission, in particular in an automatic transmission of the motor vehicle, wherein the cooling pump is, in particular, a vane pump. The cooling pump, in particular the vane pump, can be configured for delivering a coolant through a cooling circuit, wherein the cooling circuit cools an element of the transmission.

The motor vehicle can include a first component and a second component in addition to the cooling pump. The first component can be operated with different values of a first operating parameter and the second component can be operated with different values of a second operating parameter. The first component can be represented and calculated or simulated by the longitudinal dynamic model with the different values of the first operating parameter and the second component can be represented and calculated or simulated by the longitudinal dynamic model with the different values of the second operating parameter.

The longitudinal dynamic model can also include a loss model of the motor vehicle, wherein the loss model describes an overall loss of the motor vehicle. The loss model can include, for example, a list of efficiency-relevant components (for example, a height-adjustable vehicle or a system configured therefor) and degrees of freedom (for example, the set height of the chassis), which encompasses highly diverse parts of the overall "motor vehicle" system. The loss model therefore describes an overall loss of the motor vehicle. The degrees of freedom are the operating parameters of the components. "Components" according to example aspects of the present invention include, for example, actuators that are utilized for steering and damping the motor vehicle. In addition, in particular, the braking system and the drive train can form components according to example aspects of the present invention. The motor vehicle can include components in addition to the first component and the second component, the degrees of freedom of which can be planned and controlled, by way of a closed-loop system, in the same way as explained in greater detail for the first component and the second component.

The cost function includes the first term ($c_{pump}$), which represents the output of the cooling pump. The cost function can also include a second term ("$c_{efficiency}$"), which represents the (remaining) overall loss or component loss of the motor vehicle. The overall loss of the motor vehicle depends, in particular, on a combination of operating values, which includes a first value of the first operating parameter and a second value of the second operating parameter. In addition, the cost function can include further terms ("$c_{time}$", "$c_{comfort}$"), some of the advantageous ones of which are described in greater detail further below. The processor unit is configured for ascertaining, by executing the MPC algorithm as a function of the loss model, that combination of operating values, by which at least the second term ("$c_{efficiency}$") of the cost function is minimized. In addition, due to this ascertained combination of operating values, the overall cost function can also be minimized (min ($f_{cost} = c_{pump} + c_{efficiency} + c_{time} + c_{comfort}$)).

The MPC solver can ascertain the combination of operating values as a function of the loss model such that the cost function or at least the second term ("$c_{efficiency}$") is minimized. In this way, example aspects of the present invention makes it possible to select and implement an optimal combination of operating values or also a combination of actuator systems of the available degrees of freedom. The processor unit can transmit the optimized combination of operating values to the aforementioned software module ("target generator"). By this software module, the processor unit can convert the mathematically optimal planning of all available degrees of freedom into actually evaluatable component signals.

In one further example embodiment, the processor unit is configured for controlling a first actuator of the first component, by executing a conversion software module, such that the first actuator is operated with a first actuator value, as the result of which the first component is operated with the first value of the first operating parameter of that combination of operating values, by which at least the first term of the cost function is minimized. In addition, the processor unit in this example embodiment is configured for controlling a second actuator of the second component, by executing the conversion software module, such that the second actuator is operated with a second actuator value, as the result of which the second component is operated with the second value of the second operating parameter of that combination of operating values, by which at least the first term of the cost function is minimized. This example embodiment makes it possible that the actuators are controlled by an open-loop system such that the components are operated as efficiently as possible. In other words, an optimal combination of actuator values can be ascertained and implemented, and so the components and, thus, the motor vehicle can be operated as energy-efficiently as possible.

As mentioned above, the present invention is not limited to the first component and to the second component, because highly diverse, efficiency-relevant components are installed in modern vehicles, wherein these are not necessarily to be found only in the drive train. All these components with their degrees of freedom can be represented by the loss model. In one example embodiment—in particular, in addition to other efficiency-relevant components—the first component can be a system for the level control of the motor vehicle and the second component can be a braking system. A reduction of the overall losses of the motor vehicle can be achieved due to an intelligent regulation of the ride height and/or due to an intelligent activation of the brakes (which takes place due to the ascertainment of the optimal combination of operating values).

According to one further example embodiment, the second term includes an electrical energy weighted with a first weighting factor and predicted according to the longitudinal dynamic model, which is provided within a prediction horizon by a battery of the drive train for driving the electric machine. In addition, the cost function can include, as a third term, a driving time weighted with a second weighting factor and predicted according to the dynamic model, which the motor vehicle needs in order to cover the entire distance predicted within the prediction horizon. The processor unit can be configured for ascertaining an input variable for the electric machine by executing the MPC algorithm as a function of the first term, as a function of the second term, and as a function of the third term such that the cost function is minimized.

The state variables for the "driving efficiency" driving function can therefore be, for example, the vehicle speed or the kinetic energy, the energy remaining in the battery, and the driving time. Energy consumption and driving time can be optimized, for example, on the basis of the uphill grade of the upcoming route and constraints for speed and drive force, and on the basis of the current system state. The driving time, in addition to the overall loss or energy consumption, can also be minimized by the objective function and/or by the cost function of the "driving efficiency" driving strategy. As a result, depending on the selection of the weighting factors, a low speed cannot always be evaluated as optimal and, thus, the problem no longer exists that the resultant speed is always at the lower edge of the permitted speed. It is made possible that the driver influence is no longer relevant for the energy consumption and the driving time of the motor vehicle, because the electric machine can be controlled by the processor unit based on the input variable, which is ascertained by executing the MPC algorithm. By the input variable, in particular, an optimal prime mover operating point of the electric machine can be set. As a result, a direct closed-loop control of the optimal speed of the motor vehicle can be carried out.

The cost function can have, in particular, exclusively linear and quadratic terms. As a result, the overall problem has the form of a quadratic optimization with linear constraints and a convex problem results, which can be solved well and quickly. The objective function or the cost function can be formulated with a weighting (weighting factors), wherein, in particular, an energy efficiency, a driving time, and a ride comfort are calculated and weighted. An energy-optimal speed trajectory can be calculated online for an upcoming horizon on the processor unit, which can form, in particular, an integral part of a central control unit of the motor vehicle. By utilizing the MPC method, moreover, the target speed of the motor vehicle can be cyclically recalculated based on the current driving mode and the upcoming route information.

BRIEF DESCRIPTION OF THE DRAWINGS

Exemplary embodiments of the invention are explained in greater detail in the following with reference to the diagrammatic drawings, wherein identical or similar elements are labeled with the same reference characters, wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
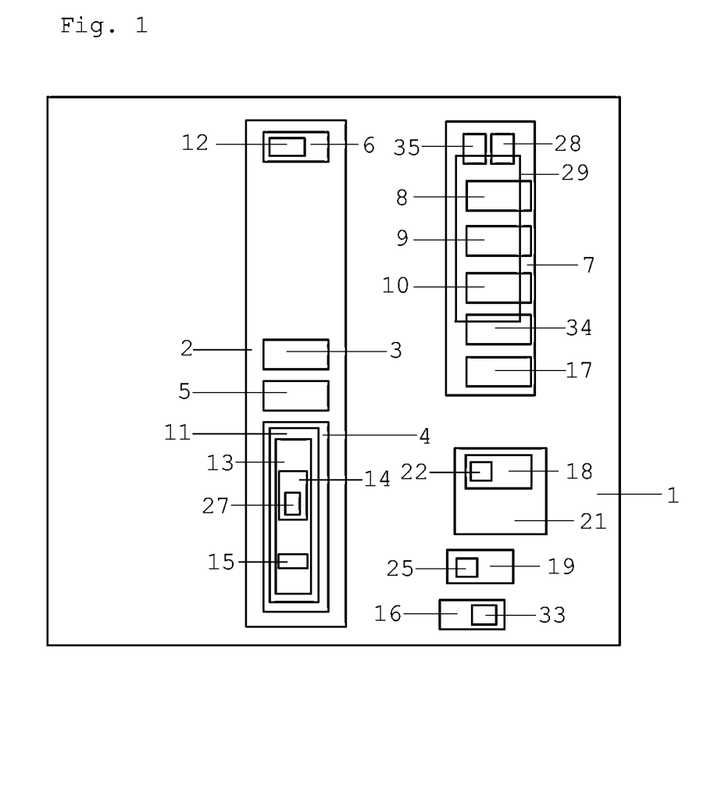
FIG. 1 shows a schematic of a motor vehicle, which includes a cooling pump, a first efficiency-relevant component, and a second efficiency-relevant component.

FIG. 1 shows a motor vehicle 1, for example, a passenger car. The motor vehicle 1 includes a system 2 for the model predictive control of the motor vehicle 1. The system 2 in the exemplary embodiment shown includes a processor unit 3, a memory unit 4, a communication interface 5, and a detection unit 6, in particular for detecting state data related to the motor vehicle 1. The motor vehicle 1 also includes a drive train 7, which can include, for example, an electric machine 8, which can be operated as a motor and as a generator, a battery 9, a transmission 10, and a power electronics unit 34. The electric machine 8, in the motor mode, can drive wheels of the motor vehicle 1 via the transmission 10, which can have, for example, a constant ratio. The battery 9 can provide the electrical energy necessary therefor. The battery 9 can be charged by the electric machine 8 when the electric machine 8 is operated in the generator mode (recuperation). Optionally, the battery 9 can also be charged at an external charging station. Likewise, the drive train of the motor vehicle 1 can optionally include an internal combustion engine 17, which, alternatively or in addition to the electric machine 8, can drive the motor vehicle 1. The internal combustion engine 17 can also be configured for driving the electric machine 8 in order to charge the battery 9.

The motor vehicle 1 also includes a cooling pump 28, which delivers a cooling liquid through a cooling circuit 29. In the exemplary embodiment shown, the cooling circuit 29 extends through the electric machine 8, the battery 9, the transmission 10, and through the power electronics unit 34, and so these aforementioned components 8, 9, 10, 34 of the drive train 7 can dissipate heat to the cooling liquid, which is delivered through the cooling circuit 29 by the cooling pump 28. The cooling liquid can be subsequently re-cooled, for example, in a heat exchanger 35.

In addition to this cooling pump 28, the motor vehicle 1 can include even more cooling pumps (not represented, for example, a vane pump in an automatic transmission of the motor vehicle, a cooling pump in a cooling unit for the interior space cooling of the motor vehicle 1, or a cooling pump at an on-board charger for cooling during the charging of the battery 9 at a charging station), which can be planned and controlled by a closed-loop system in a similar way, as described in greater detail in the following. The motor vehicle 1 also includes multiple components that are relevant for the efficiency of the operation of the motor vehicle 1 ("efficiency-relevant components"), in particular when the motor vehicle 1 is operated in an autonomous traveling mode. These components are not arranged exclusively in the drive train 7 of the motor vehicle 1. In FIG. 1, purely by way of example, a first component 18 and a second component 19 are represented, although the motor vehicle 1 still includes a number of further efficiency-relevant components. In the exemplary embodiment according to FIG. 1, a first component is represented in the form of a system 18 for the level control of the motor vehicle 1 and a second component is represented in the form of a braking system 19 of the motor vehicle 1. For example, the electric machine 8, the battery 9, the transmission 10, the internal combustion engine 17, and the cooling pump 28 can also be construed as efficiency-relevant components of the motor vehicle 1.

Figure 2:
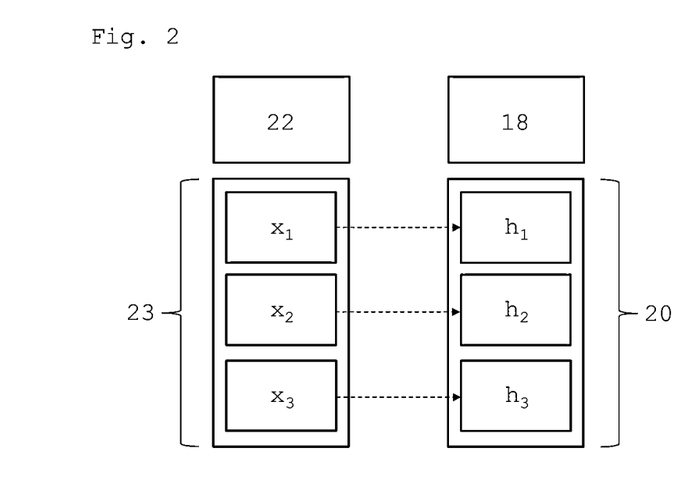
FIG. 2 shows degrees of freedom of the first efficiency-relevant component according to FIG. 1.

FIG. 2 shows that the system 18 for the level control of the motor vehicle 1 can be operated with different values of a first operating parameter 20 (first degree of freedom). For example, the first operating parameter 20 can be the set height of a chassis 21 of the motor vehicle 1. Purely by way of example, the set height of the chassis 21 of the motor vehicle 1 can assume a first value $h_1$, a second value $h_2$, and a third value $h_3$. The different heights $h_1$, $h_2$, and $h_3$ of the chassis 21 can result in a different level of a drag force of the motor vehicle 1 in each case. This can be represented by the longitudinal model 14 of the drive train 7 of the motor vehicle 1 described further below.

The system 18 for the level control of the motor vehicle 1 can be construed as an actuator of the motor vehicle 1. In addition, the system 18 for the level control of the motor vehicle 1 itself can include at least one actuator 22 (for example, a hydraulic cylinder or a pneumatic cylinder or a hydro-pneumatic shock absorber), which the system 18 actuates for the level control of the motor vehicle 1. The first actuator 22 can be operated with different actuator values 23, and so the different values $h_1$, $h_2$, and $h_3$ result for the system 18 for the level control of the motor vehicle 1. For example, a first actuator value $x_1$ (for example, a first pressure value for a hydraulic cylinder) yields the first height $h_1$ of the chassis 21, a second actuator value $x_2$ yields the second height $h_2$ of the chassis 21, and a third actuator value $x_3$ yields the third height $h_3$ of the chassis 21.

Figure 3:
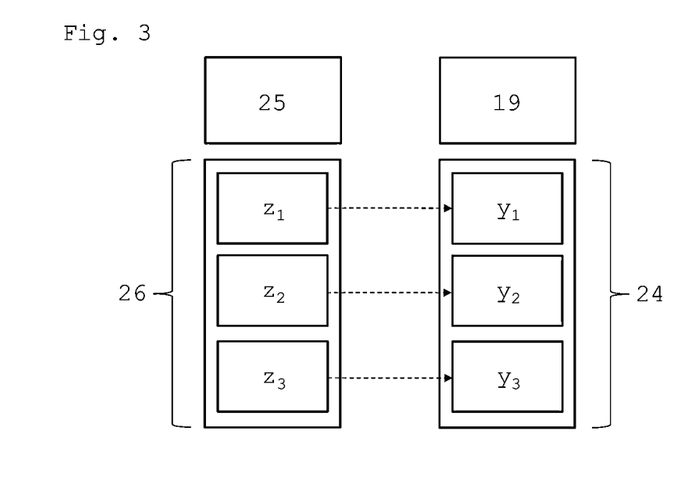
FIG. 3 shows degrees of freedom of the second efficiency-relevant component according to FIG. 1.

FIG. 3 shows that the braking system 19 can be operated with different values of a second operating parameter 24 (second degree of freedom). For example, the second operating parameter 24 can be the braking force of the braking system 19. Purely by way of example, the braking force can assume a first value $y_1$, a second value $y_2$, and a third value $y_3$. The different levels of the braking forces $y_1$, $y_2$, and $y_3$ of the braking system 19 can result in a different level of a traction force, in each case, that is exerted by the braking system upon the wheels of the motor vehicle 1. This can be represented by the longitudinal model 14 of the drive train 7 of the motor vehicle 1 described further below.

The braking system 19 can be construed as an actuator of the motor vehicle 1. In addition, the braking system 19 itself can include an actuator 25 (for example, a hydraulic cylinder), which actuates the braking system 19. The second actuator 25 can be operated with different actuator values 26, and so the different values $y_1$, $y_2$, and $y_3$ result for the braking system 19. For example, a first actuator value $z_1$ yields the first braking force $y_1$, a second actuator value $z_2$ yields the second braking force $y_2$, and a third actuator value $z_3$ yields the third braking force $y_3$.

Figure 4:
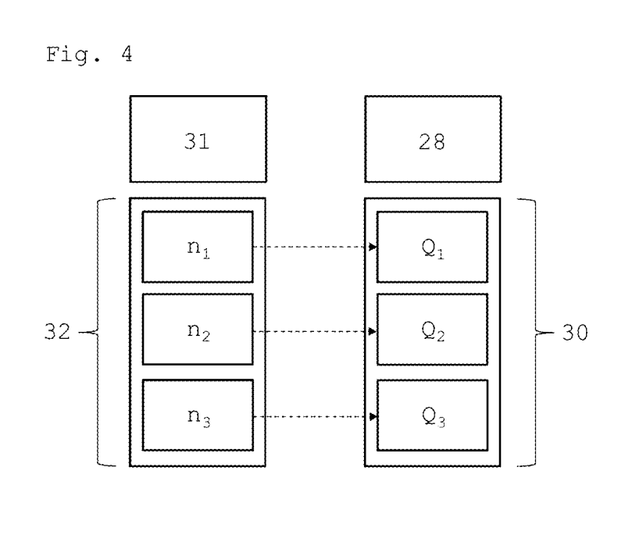
FIG. 4 shows degrees of freedom of the cooling pump according to FIG. 1.

FIG. 4 shows that the cooling pump 28 can be operated with different pump operating values of a third operating parameter 30 (third degree of freedom). For example, the third operating parameter 30 can be the displacement Q (=the flow of the coolant that can be delivered by the cooling pump 28). Purely by way of example, the displacement can assume a first value $Q_1$, a second value $Q_2$, and a third value $Q_3$. The different levels of displacement $Q_1$, $Q_2$, and $Q_3$ of the cooling pump 28 result in a different level of output $P_{Pumpe}$ of the cooling pump 28. This can be represented by the longitudinal model 14 of the drive train 7 of the motor vehicle 1 described further below.

In addition, the cooling pump 28 can include an actuator 31 (for example, a motor), which actuates and drives the cooling pump 28. The second actuator 31 can be operated with different actuator values 32 (for example, with different rotational speeds $n_1$, $n_2$, $n_3$ for driving the cooling pump 28), and so the different pump operating values $Q_1$, $Q_2$, and $Q_3$ result for the cooling pump 28. For example, a first rotational speed $n_1$ (first actuator value $n_1$) yields the first displacement $Q_1$, a second rotational speed $z_2$ yields the second displacement $Q_2$, and a third rotational speed $z_3$ yields the third displacement $Q_3$.

A computer program product 11 can be stored on the memory unit 4. The computer program product 11 can be run on the processor unit 3, for the purpose of which the processor unit 3 and the memory unit 4 are communicatively connected to each other by the communication interface 5. When the computer program product 11 is run on the processor unit 3, the computer program product 11 instructs the processor unit 3 to perform the functions described in conjunction with the drawing and/or to carry out method steps.

The computer program product 11 includes an MPC algorithm 13. The MPC algorithm 13 includes a longitudinal dynamic model 14 of the drive train 7 of the motor vehicle 1. The MPC algorithm 13 also includes a cost function 15 to be minimized. A first term $c_{pump}$ describes the output of the cooling pump 28. The first term $c_{pump}$ represents the parameterizable costs with respect to the output of the cooling pump 28. A second term $c_{efficiency}$ of the cost function 15 represents the overall loss of the motor vehicle 1, which, in the exemplary embodiment shown, depends on the efficiency of the first component 18 and the second component 19. Therefore, the cost function 15 to be minimized can be expressed mathematically as follows:

$$\min(c_{pump}+c_{efficiency}+c_{time}+c_{comfort})$$

Wherein:

$c_{pump}$ are the parameterizable costs with respect to the output of the cooling pump, $c_{efficiency}$ are the parameterizable costs with respect to efficiency, $c_{time}$ are the parameterizable costs with respect to the travel time, and $c_{comfort}$ are the parameterizable costs with respect to comfort.

The detection unit 6 can measure current state variables of the motor vehicle 1, record appropriate data, and supply these to the MPC algorithm 13. In addition, route data from an electronic map can be updated, in particular cyclically, for a prediction horizon (for example, four hundred meters (400 m)) ahead of the motor vehicle 1. The route data can include, for example, uphill grade information, curve information, and information about speed limits. Moreover, a curve curvature can be converted, via a maximum permissible lateral acceleration, into a speed limit for the motor vehicle 1. In addition, a position finding of the motor vehicle can be carried out by the detection unit 6, in particular via a signal generated by a GNSS sensor 12 for the precise localization on the electronic map. Moreover, the detection unit for detecting the external surroundings of the motor vehicle 1 can include, for example, a radar sensor, a camera system, and/or a LIDAR sensor. The processor unit 3 can access information of the aforementioned elements, for example, via the communication interface 5. This information can be incorporated into the longitudinal dynamic model 14 of the motor vehicle 1, in particular as restrictions or constraints.

The processor unit 3 executes the MPC algorithm 13 and, thus, ascertains an optimal speed trajectory based on the longitudinal dynamic model 14, in particular under consideration of a route topology, the traffic, and further surroundings information (as described in the preceding paragraph). This speed trajectory can now be planned together with the new degree of freedom. In this sense, the strategy no longer only plans a speed trajectory, but also the adjustment of the output of the pump 28 along this speed trajectory. This is achieved in that the processor unit 3 executes the MPC algorithm 13 and, thus, ascertains a pump operating value trajectory appropriate for the optimal speed trajectory.

Thus, an optimized speed value of the motor vehicle 1 and an optimized pump operating value of the pump 28 are simultaneously associated with each waypoint within the prediction horizon. In the simplified example according to FIG. 4, the processor unit 3 can combine possible speed values with the possible three displacements $Q_1$, $Q_2$, $Q_3$ of the cooling pump 28 for each waypoint within the prediction horizon and select the combination, by which the first term $c_{Pump}$ of the cost function 15 and the cost function 15 as a whole are minimized. In this way, an integrated optimization of various degrees of freedom is carried out, which results, in particular, in a driving behavior that is more efficient as a whole. It should be noted that the optimization of the individual degrees of freedom, for example, speed of the motor vehicle 1 and displacement of the cooling pump 28, can be carried out simultaneously.

The processor unit 3 can output appropriate value pairs (value 1: optimized speed of the vehicle 1; value 2.1: optimized displacement of the cooling pump 28; alternative value 2.2: optimized rotational speed of the motor 30 of the cooling pump 28) to a target generator 33, which can be integrated as a software module into the MPC algorithm 13. Alternatively, the target generator 33 can also be included, for example, as a software module in a driver assistance system 16, as shown in FIG. 1. Based on this value pair, the speed of the motor vehicle 1 can be regulated to the value 1 and the displacement of the cooling pump 28 can be regulated to the value 2.1, in particular by the target generator 33.

In addition, the processor unit 3 can also regulate the third actuator 30 to the value 2.2, and so the value 2.1 sets in for the cooling pump 28.

In the exemplary embodiment shown, the longitudinal dynamic model 14 includes a loss model 27 of the motor vehicle 1. The loss model 27 describes the operating behavior of the efficiency-relevant components 18, 19 with respect to their efficiency and with respect to their loss. This yields the overall loss of the motor vehicle 1. The processor unit 3 executes the MPC algorithm 13 and, in so doing, predicts a behavior of the motor vehicle 1 based on the longitudinal dynamic model 14, wherein the cost function 15 is minimized.

The overall loss of the motor vehicle 1 depends on a combination of operating values. The combination of operating values includes a first value of the first operating parameter and a second value of the second operating parameter. In the simplified exemplary embodiment shown, there are six possible combinations of operating values. A first combination of operating values includes the first height $h_1$ of the chassis 21 and the first braking force $y_1$ of the braking system 19. The first combination of operating values yields a first overall loss of the motor vehicle 1. A second combination of operating values includes the first height $h_1$ of the chassis 21 and the second braking force $y_2$ of the braking system 19. The second combination of operating values yields a second overall loss of the motor vehicle 1. A third combination of operating values includes the first height $h_1$ of the chassis 21 and the third braking force $y_3$ of the braking system 19. The third combination of operating values yields a third overall loss of the motor vehicle 1. A fourth combination of the operating values includes the second height $h_2$ of the chassis 21 and the first braking force $y_1$ of the braking system 19. The fourth combination of operating values yields a fourth overall loss of the motor vehicle 1. A fifth combination of operating values includes the second height $h_2$ of the chassis 21 and the third braking force $y_3$ of the braking system 19. The fifth combination of operating values yields a fifth overall loss of the motor vehicle 1. A sixth combination of operating values includes the third height $h_3$ of the chassis 21 and the third braking force $y_3$ of the braking system 19. The sixth combination of operating values yields a sixth overall loss of the motor vehicle 1.

The processor unit 3 can ascertain the aforementioned six combinations of operating values by executing the MPC algorithm 13 as a function of the loss model 14. The processor unit 3 can compare the overall losses resulting from the six different combinations of operating values with one another. The processor unit 3 can establish, for example, that the third combination of operating values ($h_1$; $y_3$) results in the lowest overall loss of the motor vehicle 1. The processor unit 3 can select the third combination of operating values and output the appropriate values, for example to the target generator 33. Based on the ascertained combination of operating values ($h_1$; $y_3$), the first component 18 can be regulated to the first value $h_1$ of the first operating parameter 20 and the second component 19 can be regulated to the third value $y_1$ of the second operating parameter 24, in particular by the target generator 33. In addition, the processor unit 3 can also regulate the first actuator 22 to the first actuator value $x_1$, and so the first value $h_1$ of the first operating parameter 20 sets in for the first component 18. In a similar way, the processor unit 3 can regulate the second actuator 25 to the third actuator value $z_3$, and so the third $y_3$ value of the second operating parameter 24 sets in for the second component 19.

In addition, an optimal rotational speed and an optimal torque of the electric machine 8 for calculated points in the prediction horizon can result as the output of the optimization by the MPC algorithm 13. For this purpose, the processor unit 3 can ascertain an input variable for the electric machine 8, enabling the optimal rotational speed and the optimal torque to set in. The processor unit 3 can control the electric machine 8 based on the ascertained input variable. This can also be carried out by the driver assistance system 16, however, in particular by it's the target generator 33.

The longitudinal dynamic model 14 of the motor vehicle 1 can be expressed mathematically as follows:

$$\frac{dv(t)}{dt} = (F_{trac}(t) - F_r(\alpha(t)) - F_{gr}(\alpha(t)) - F_d(v(t)) - P_{pump}(t))/m_{eq}$$

Wherein:
V is the speed of the motor vehicle;
$F_{trac}$ is the tractive force exerted by the prime mover or the brakes upon the wheels of the motor vehicle, for example, influenced by the above-described different levels of braking forces $y_1$, $y_2$, and $y_3$ of the braking system 19;
$F_r$ is the rolling resistance, which is an effect of the deformation of the tires during rolling and depends on the load of the wheels (on the normal force between the wheel and the road) and, thus, on the inclination angle of the road;
$F_{gr}$ is the gradient resistance, which describes the longitudinal component of gravity, which acts upon the motor vehicle during operation uphill or downhill, depending on the gradient of the roadway;
$F_d$ is the drag force of the motor vehicle, for example, influenced by the above-described different heights $h_1$, $h_2$, and $h_3$ of the chassis 21;
$P_{pump}$ is the output of the cooling pump, for example, influenced by the above-described different levels of displacement $Q_1$, $Q_2$, and $Q_3$ of the cooling pump 28, and
$m_{eq}$ is the equivalent mass of the motor vehicle; the equivalent mass includes, in particular, the inertia of the turned parts of the drive train, which are subjected to the acceleration of the motor vehicle (prime mover, transmission input shafts, wheels).

By converting time dependence into distance dependence $$\frac{d}{ds} = \frac{d}{dt} * \frac{dt}{ds} = \frac{d}{dt} * \frac{1}{v}$$

and coordinate transformation in order to eliminate the quadratic speed term in the aerodynamic drag with $$e_{kin} = \frac{1}{2} * m_{eq} * v(t)^2,$$

the result is $$\frac{de_{kin}}{ds} = F_{trac}(s) - F_r(\alpha(s)) - F_{gr}(\alpha(s)) - F_d(e_{kin}(s) - P_{pump}(s)).$$

In order to ensure that the problem is quickly and easily solvable by the MPC algorithm 13, the dynamic equation of the longitudinal dynamic model 14 can be linearized, in that the speed is expressed, via coordinate transformation, by kinetic energy $de_{kin}$. As a result, the quadratic term for calculating the aerodynamic drag $F_d$ is replaced by a linear term and, simultaneously, the longitudinal dynamic model 14 of the motor vehicle 1 is no longer described as a function of time, as usual, but rather as a function of distance. This fits well with the optimization problem, since the predictive information of the electrical horizon is based on distance.

Figure 5:
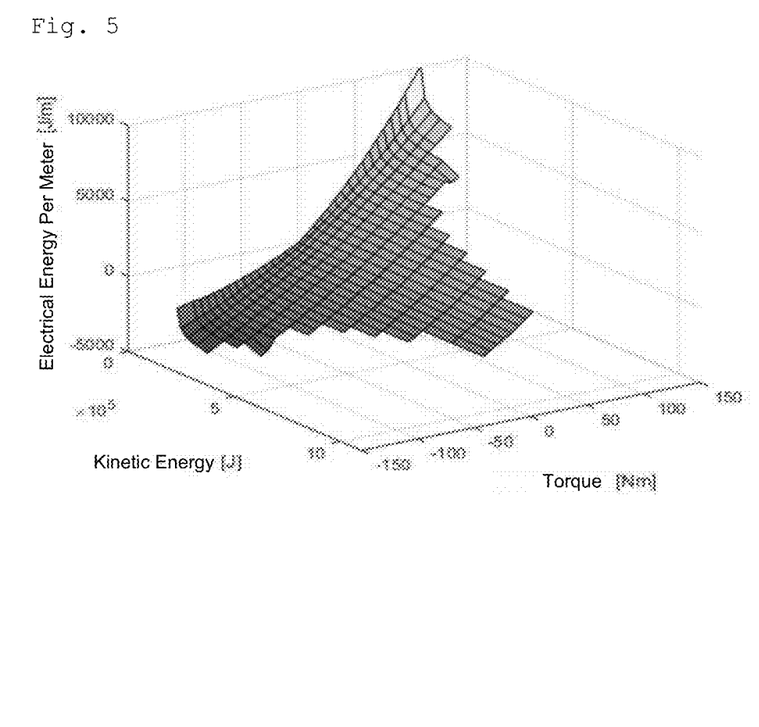
FIG. 5 shows a characteristic map of an electric machine for the vehicle according to FIG. 1.

In addition to the kinetic energy, there are two further state variables, which, within the scope of a simple optimization problem, can also be described in a linear and distance-dependent manner. On the one hand, the electrical energy consumption of the drive train 7 is usually described in the form of a characteristic map as a function of torque and prime mover speed. In the exemplary embodiment shown, the motor vehicle 1 has a fixed ratio between the electric machine 8 and the road on which the motor vehicle 1 moves. As a result, the rotational speed of the electric machine 8 can be directly converted into a speed of the motor vehicle 1 or even into a kinetic energy of the motor vehicle 1. In addition, the electrical power of the electric machine 8 can be converted into energy consumption per meter via division by the appropriate speed. As a result, the characteristic map of the electric machine 8 obtains the form shown in FIG. 5. In order to be able to utilize this characteristic map for the optimization, it is linearly approximated: Energy$_{perMeter} \geq a_i * e_{kin} + b_i * F_{trac}$ for all i.

In detail, the cost function 15 to be minimized can be expressed mathematically as follows:

$$\min \left( c_{pump} + c_{efficiency} - w_{Bat} \cdot E_{Bat}(s_E) + \right.$$

$$w_{Time} \cdot T(s_E) + w_{Tem} \cdot \sum_{s=1}^{s_E-1} \left( \frac{F_A(s) - F_A(s-1)}{\Delta s} \right)^2 +$$

$$\left. w_{TemStart} \cdot (F_A(s_1) - F_A(s_0))^2 + \sum_{s=1}^{s_E-1} w_{Slack} \cdot Var_{slack} \right)$$

Wherein:

$c_{pump}$ are the parameterizable costs with respect to the output of the cooling pump, $c_{efficiency}$ represents the parameterizable efficiency costs of the efficiency-relevant components, for example, the above-described components 19, 20, $w_{Bat}$ is the weighting factor for the energy consumption of the battery $E_{Bat}$ is the energy consumption of the battery S is the distance $S_{E-1}$ is the distance one time step before the end of the prediction horizon $F_A$ is the drive force that is provided by the electric machine, transmitted by a transmission at a constant ratio, and applied at a wheel of the motor vehicle $W_{Tem}$ is the weighting factor for torque gradients $W_{TemStart}$ is the weighting factor for torque surges T is the time that the vehicle needs in order to cover the entire distance predicted within the prediction horizon $W_{Time}$ is the weighting factor for the time T $S_E$ is the distance to the end of the horizon $W_{Slack}$ is the weighting factor for the slack variable $Var_{Slack}$ is the slack variable The cost function 15 has exclusively linear and quadratic terms. As a result, the overall problem has the form of a quadratic optimization with linear constraints and a convex problem results, which can be solved well and quickly.

The cost function 15 includes, in addition to the above-described parameterizable costs $c_{pump}$ of the cooling pump 28 and efficiency costs of the components 19, 20, as one further term, an electrical energy $E_{Bat}$ weighted with a first weighting factor $w_{Bat}$ and predicted according to the longitudinal dynamic model, which is provided within a prediction horizon by the battery 9 of the drive train 7 for driving the electric machine 8. The battery 9 and the electric machine 8 can be construed as efficiency-relevant components of the motor vehicle 1, similarly to the above-described system 18 for level control and the above-described braking system 19. Correspondingly, the electrical energy $E_{Bat}$ weighted with the first weighting factor $w_{Bat}$ and predicted according to the longitudinal dynamic model can also be incorporated into the term $c_{efficiency}$.

The cost function 15 includes, as one further term, a driving time T weighted with a second weighting factor $W_{Time}$ and predicted according to the longitudinal dynamic model 14, which the motor vehicle 1 needs in order to cover the predicted distance. As a result, depending on the selection of the weighting factors, a low speed cannot always be evaluated as optimal and, thus, the problem no longer exists that the resultant speed is always at the lower edge of the permitted speed. The energy consumption and the driving time can both be evaluated and weighted at the end of the horizon. These terms are therefore active only for the last point of the horizon.

Excessively high torque gradients within the horizon are disadvantageous. Therefore, torque gradients are already penalized in the cost function 15, namely by the term $$w_{Tem} \cdot \sum_{s=1}^{s_E-1} \left( \frac{F_A(s) - F_A(s-1)}{\Delta s} \right)^2.$$

The quadratic deviation of the drive force per meter is weighted with a weighting factor $W_{Tem}$ and minimized in the cost function. Alternatively to the drive force $F_A$ per meter, the torque $M_{EM}$ provided by the electric machine 8 can also be utilized and weighted with the weighting factor $W_{Tem}$, and so the alternative term $$w_{Tem} \cdot \sum_{s=1}^{s_E-1} \left( \frac{M_{EM}(s) - M_{EM}(s-1)}{\Delta s} \right)^2$$

results. Due to the constant ratio of the transmission 10, the drive force and the torque are directly proportional to one another.

In order to ensure comfortable driving, one further term is introduced in the cost function 15 for penalizing torque surges, namely $w_{TemStart} \cdot (F_A(s_1) - F_A(s_0))^2$. Alternatively to the drive force $F_A$, the torque $M_{EM}$ provided by the electric machine 8 can also be utilized here, and so the alternative term $w_{TemStart} \cdot (M_{EM}(s_1) - M_{EM}(s_0))^2$ results. For the first point in the prediction horizon, the deviation from the most recently set torque can be evaluated as negative and weighted with a weighting factor $W_{TemStart}$ in order to ensure that there is a seamless and smooth transition during the change-over between an old trajectory and a new trajectory.

Speed limits are hard limits for the optimization that are not permitted to be exceeded. A slight exceedance of the speed limits is always permissible in reality and tends to be the normal case primarily during transitions from one speed zone into a second zone. In dynamic surroundings, where speed limits shift from one computing cycle to the next computing cycle, it can happen, in the case of very hard limits, that a valid solution for a speed profile can no longer be found. In order to increase the stability of the computational algorithm, a soft constraint is introduced into the cost function 15. A slack variable $Var_{Slack}$ weighted with a weighting factor $W_{Slack}$ becomes active in a predefined narrow range before the hard speed limit is reached. Solutions that are situated very close to this speed limit are evaluated as poorer, i.e., solutions, the speed trajectory of which maintains a certain distance to the hard limit.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS $h_1$ first value of first operating parameter
$h_2$ second value of first operating parameter
$h_3$ third value of first operating parameter
$n_1$ first actuator value of the third actuator
$n_2$ second actuator value of the third actuator
$n_3$ third actuator value of the third actuator
$Q_1$ first pump operating value
$Q_2$ second pump operating value
$Q_3$ third pump operating value
$x_1$ first actuator value of the first actuator
$x_2$ second actuator value of the first actuator
$x_3$ third actuator value of the first actuator
$y_1$ first value of second operating parameter
$y_2$ second value of second operating parameter
$y_3$ third value of second operating parameter
$z_1$ first actuator value of the second actuator
$z_2$ second actuator value of the second actuator
$z_3$ third actuator value of the second actuator
1 vehicle
2 system
3 processor unit
4 memory unit
5 communication interface
6 detection unit
7 drive train
8 electric machine
9 battery
10 transmission
11 computer program product
12 GNSS sensor
13 MPC algorithm
14 longitudinal dynamic model
15 cost function
16 driver assistance system
17 internal combustion engine
18 system for the level control
19 braking system
20 first operating parameter
21 chassis
22 first actuator
23 actuator values of the first actuator
24 second operating parameter
25 second actuator
26 actuator values of the second actuator
27 loss model
28 cooling pump
29 cooling circuit
30 third operating parameter
31 third actuator
32 actuator values of the third actuator
33 target generator
34 power electronics unit
35 heat exchanger

The invention claimed is:

1. A processor unit (3) for model predictive control, MPC, of a motor vehicle (1) that includes a cooling pump (28), operable with different pump operating values (Q1, Q2, Q3) of at least one operating parameter (30), wherein:
the processor unit (3) configured for executing an MPC algorithm (13) for model predictive control of the motor vehicle (1), the MPC algorithm (13) comprising a longitudinal dynamic model (14) of the motor vehicle (1) and a cost function (15) to be minimized, the cost function (15) comprising a plurality of terms, including a first term representing an output of the cooling pump (28); and
the processor unit (3) is configured for, by executing the MPC algorithm (13), ascertaining a speed trajectory of the motor vehicle (1) situated within a prediction horizon as a function of the longitudinal dynamic model (14), and
simultaneously ascertaining a pump operating value trajectory situated within the prediction horizon such that the first term of the cost function (15) is minimized,
controlling a drive train of the motor vehicle (1) based on the speed trajectory of the motor vehicle (1), and
controlling a pump of the motor vehicle (1) based on the pump operating value trajectory.

2. The processor unit (3) of claim 1, wherein the cooling pump (28) is arranged in a drive train (7) of the motor vehicle (1) and is configured for delivering a coolant through a cooling circuit (29), wherein the cooling circuit (29) cools one or more of the following components of the drive train (7):
an electric machine (8);
a transmission (10);
a power electronics unit (34); and
a battery (9).

3. The processor unit (3) of claim 1, wherein the cooling pump is configured for delivering a coolant through a cooling circuit, and the cooling circuit is configured to cool an interior space of the motor vehicle (1).

4. The processor unit (3) of claim 1, wherein the cooling pump is configured for delivering a coolant through a cooling circuit, and the cooling circuit is configured to cool an on-board charger of the motor vehicle (1).

5. The processor unit (3) of claim 1, wherein the cooling pump is a vane pump in a transmission of the motor vehicle (1) and is configured for delivering a coolant through a cooling circuit, and the cooling circuit is configured to cool components of the transmission.

6. The processor unit (3) of claim 1, wherein:
the motor vehicle (1) further comprises a first component (18) operable with different values (h1, h2, h3) of a first operating parameter (20);

the motor vehicle (1) comprises a second component (19) operable with different values (y1, y2, y3) of a second operating parameter (24);

the longitudinal dynamic model (14) comprises a loss model (27) of the motor vehicle (1);

the loss model (27) describes an overall loss of the motor vehicle (1);

the cost function (15) comprises a second term representing the overall loss of the motor vehicle (1);

the overall loss depends on a combination of operating values, including a first value (h1; h2; h3) of the first operating parameter (20) and a second value (y1; y2; y3) of the second operating parameter (24); and the processor unit (3) is configured for ascertaining, by executing the MPC algorithm (13) as a function of the loss model (14), a combination of operating values by which the second term of the cost function (15) is minimized.

7. The processor unit (3) of claim 6, wherein:

the second term comprises an electrical energy weighted with a first weighting factor and predicted according to the longitudinal dynamic model (14), which is provided within a prediction horizon by a battery (9) of the drive train (7) for driving the electric machine (8);

the cost function (15) comprises, as a third term, a driving time weighted with a second weighting factor and predicted according to the longitudinal dynamic model (14), which the motor vehicle (1) requires in order to cover the entire distance predicted within the prediction horizon; and the processor unit (3) is configured for ascertaining an input variable for the electric machine (8) by executing the MPC algorithm (13) as a function of the second term and as a function of the third term such that the cost function (15) is minimized.

8. A motor vehicle (3) comprising:

the processor unit (3) of claim 1;

a driver assistance system (16);

a drive train (7); and a cooling pump (18) operable with different pump operating values (Q1, Q2, Q3) of at least one operating parameter (30), wherein the driver assistance system (16) is configured for:

accessing a speed trajectory of the motor vehicle (1) situated within a prediction horizon and ascertained by the processor unit (3);

accessing a pump operating value trajectory situated within the prediction horizon and simultaneously ascertained by the processor unit (3);

controlling the drive train (7) of the motor vehicle (1) based on the speed trajectory of the motor vehicle (1); and controlling the cooling pump (28) based on the pump operating value trajectory.

9. A method for model predictive control, MPC, of a motor vehicle (1) that includes a cooling pump (28) operable with different pump operating values (Q1, Q2, Q3) of at least one operating parameter (30), the method comprising:

executing an MPC algorithm (13) for model predictive control of the motor vehicle (1), the MPC algorithm (13) comprising a longitudinal dynamic model (14) of the motor vehicle (1) and a cost function (15) to be minimized, the cost function (15) comprising a plurality of terms with a first term that represents an output of the cooling pump (28);

ascertaining a speed trajectory of the motor vehicle (1) situated within a prediction horizon by executing the MPC algorithm (13) as a function of the longitudinal dynamic model (14); and ascertaining a pump operating value trajectory situated within the prediction horizon by executing the MPC algorithm (13) such that the first term of the cost function (15) is minimized;

controlling a drive train of the motor vehicle (1) based on the speed trajectory of the motor vehicle (1); and controlling a pump of the motor vehicle (1) based on the pump operating value trajectory, wherein the ascertainment of the speed trajectory and of the pump operating value trajectory take place simultaneously.

10. A computer program product (11) for model predictive control, MPC, of a motor vehicle (1) that includes a cooling pump (28) operable with different pump operating values (Q1, Q2, Q3) of at least one operating parameter (30), wherein the computer program product (11), when run on a processor unit (2) instructs the processor unit (3) to:

execute an MPC algorithm (13) for model predictive control of the motor vehicle (1), the MPC algorithm (13) comprising a longitudinal dynamic model (14) of the motor vehicle (1) and a cost function (15) to be minimized, the cost function (15) comprising a plurality of terms with a first term that represents an output of the cooling pump (28), and by executing the MPC algorithm (13), compute a speed trajectory of the motor vehicle (1) situated within a prediction horizon as a function of the longitudinal dynamic model (14), and simultaneously compute a pump operating value trajectory situated within the prediction horizon such that the first term of the cost function (15) is minimized, controlling a drive train of the motor vehicle (1) based on the speed trajectory of the motor vehicle (1), and controlling a pump of the motor vehicle (1) based on the pump operating value trajectory.

11. The processor unit (3) of claim 1, wherein:

ascertaining the speed trajectory of the motor vehicle (1) as the function of the longitudinal dynamic model (14) comprises computing the speed trajectory of the motor vehicle (1) as the function of the longitudinal dynamic model (14); and simultaneously ascertaining the pump operating value trajectory such that the first term of the cost function (15) is minimized comprises simultaneously computing the pump operating value trajectory such that the first term of the cost function (15) is minimized.

* * * * *